United States Patent [19]
Lee

[11] Patent Number: 6,052,208
[45] Date of Patent: *Apr. 18, 2000

[54] FACSIMILE-TELEVISION SYSTEM AND FACSIMILE SIGNAL TRANSMITTING METHOD THEREOF

[75] Inventor: Jun Weon Lee, Kumi, Rep. of Korea

[73] Assignee: LG Electronics, Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/832,750

[22] Filed: Apr. 4, 1997

[30] Foreign Application Priority Data

Apr. 22, 1996 [KR] Rep. of Korea ............. P96-12212

[51] Int. Cl.$^7$ ............................................. H04N 1/40
[52] U.S. Cl. ................................... 358/468; 358/479
[58] Field of Search .............................. 358/468, 453, 358/456, 479, 909.1; 348/552

[56] References Cited

U.S. PATENT DOCUMENTS 4,688,108  8/1987  Cotton et al. ........................ 358/257
5,193,012  3/1993  Schmidt ............................... 358/456
5,235,432  8/1993  Creedon et al. ..................... 358/479
5,313,285  5/1994  Yokoyama .......................... 358/453
5,546,194  8/1996  Ross .................................... 358/445

*Primary Examiner*—Andrew W. Johns
*Attorney, Agent, or Firm*—Fish & Richardson, P.C.

[57] ABSTRACT

A facsimile-television system which allows a video image of a television system to be transmitted to a facsimile installed within the facsimile-television system or to another facsimile provided outside the facsimile-television system by using a Group III format converter. The system includes a television system, a facsimile connected to the television system and a facsimile controller. The facsimile comprises a Group III format data converter receiving a synchronization signal and a luminance signal from the television system for converting the luminance signal to a Group III format data to produce the Group III format data, and a selection switch receiving the Group III format data for selecting one function among a group of functions consisting of a function of transmitting the luminance signal to the facsimile, a function of transmitting the luminance signal to another facsimile provided outside the facsimile-television system and a normal facsimile function independently of the television system, in accordance with a control signal generated by the facsimile controller.

7 Claims, 8 Drawing Sheets

FIG. 8

| WHITE RUNLENGTH | CODE WORD | BLACK RUNLENGTH | CODE WORD |
|---|---|---|---|
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |
| 9 | 10100 | 9 | 000100 |
| 10 | 00111 | 10 | 0000100 |
| 11 | 01000 | 11 | 0000101 |
| 12 | 001000 | 12 | 0000111 |
| ⋮ | ⋮ | ⋮ | ⋮ |
| 62 | 00110011 | 62 | 000001100110 |
| 63 | 00110100 | 63 | 000001100111 |

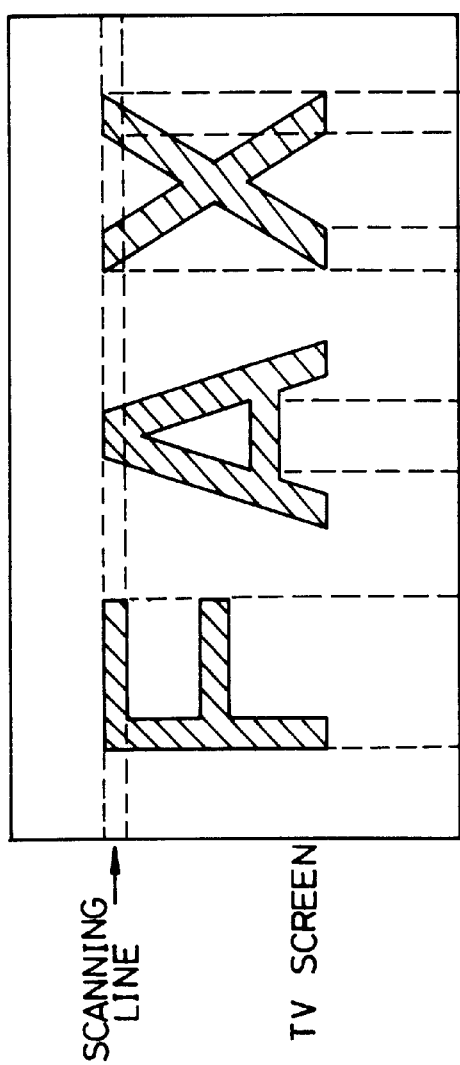
FIG. 9A
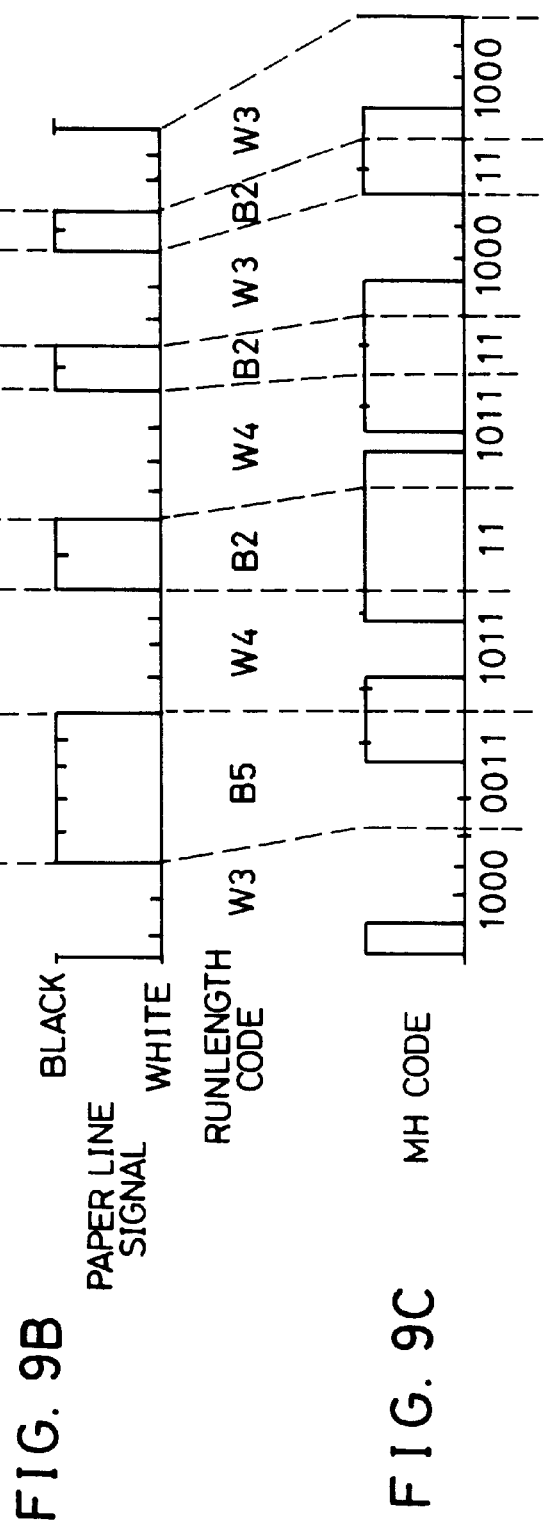
FIG. 9B
FIG. 9C

FACSIMILE-TELEVISION SYSTEM AND FACSIMILE SIGNAL TRANSMITTING METHOD THEREOF

BACKGROUND OF THE INVENTION

1. Field of the Invention

The present invention relates to a facsimile-television system and a facsimile signal transmitting method thereof, and more particularly to a facsimile-television system and the facsimile signal transmitting method thereof which allows a television image to be transmitted to a facsimile installed within the facsimile-television system or to another facsimile provided outside the facsimile-television system by using a converter for Group III format.

2. Description of the Prior Art

A facsimile-television system (hereinafter referred to as "fax-TV") in accordance with a conventional art is shown in FIG. 1. The fax-TV has a TV system 108, facsimile (fax) part 101–106, facsimile (fax) controller 107 and an image capture circuit 109 coupled between the TV system 108 and the facsimile. The facsimile (fax) part includes a network controller 101 for connecting an external telephone line and connecting/blocking a telephone call, a modulator-demodulator (modem) 102 for converting an analog signal from the external telephone line to a digital signal, an encoding/decoding section 103 for encoding the digital signal from the modem 102 to facsimile format data, for example, Group III format data, and for decoding data to be transmitted through the modem, a buffer memory 104 for temporarily storing the coded data before printing and temporarily storing the decoded data before transmitting to the modem, a printing section 106 for printing the data stored in the buffer memory and a reading section (scanner) 105 for loading the paper to be transmitted and reading or scanning information on the paper. A data transmitter/receiver has the network controller 101, the modem 102, the encoding/decoding section 103 and the buffer memory 104. The fax controller 107 controls the total function of the fax and the image capture circuit 109 captures an image data of one TV frame to transmit to the fax.

With reference to the receiving process of the fax-TV shown in FIG. 1, if a telephone from a given outside fax reaches a fax installed within the fax-TV, the network controller 101 in the fax-TV checks the number of rings. If the number of rings reaches a designated value, the fax controller 107 establishes a call and the analog signal from the outside telephone line is converted to a digital signal at the modem 102 in the fax-TV. Then, the digitized signal, which is in the facsimile data format, is decoded at the encoding/decoding section 103, i.e., converting the Group III format data to the digital image signal for fax. The decoded data is temporarily stored in the buffer memory 104 and then printed at the printing section 106.

As to the transmitting process of the fax-TV, a paper containing an image thereon to be transmitted is loaded, which is sensed at the fax controller 107 and a user dials a telephone number corresponding to a place to which the transmission is made and where a receiving fax is located. According to the dialed telephone number, the fax controller 107 establishes a telephone call and the read-out (scanned) data from the reading section 105 (scanner) is stored in the buffer memory 104. Thereafter, the image signal is subjected to the encoding process, i.e., the image signal is converted to the Group 3 format data, at the encoding/decoding section 103. The encoded data is converted from the digital signal to the analog signal by the modem 102, and then the analog signal is transmitted through the network controller 101 to the receiving fax. Subsequently, the fax controller 107 transmits a code representing the end of the paper and disconnects the call to terminate the transmission, if the end of the paper is detected at the reading section 105.

On the other hand, the process for transmitting an image signal of the TV system (a video signal) to the fax installed within the TV system is explained below. If a printing command is generated using a remote controller by the user, the image capture circuit 109 captures one frame of video image data by using a synchronization signal and a luminance signal transmitted from the TV system 108, stores the captured frame temporarily and then the printing section prints the image signal stored in the buffer memory 104.

In the conventional art, the image capture circuit is coupled between the TV system and the fax in order to transmit and print the image signal of the TV system to the fax installed within the fax-TV. In particular, the image capture circuit 109 is directly connected to the buffer memory. The encoding/decoding section 103, the buffer memory 104 and the fax controller 107 of the fax tend to be integrated into one chip, so that it is difficult to directly connect the buffer memory to the image capture circuit and accordingly it is difficult to print the image signal through the fax installed within the fax-TV.

In addition, because the conventional fax-TV has only the function of printing the image signal of the TV system, it is impossible to transmit the image signal of TV system to another fax provided outside the fax-TV.

SUMMARY OF THE INVENTION

Accordingly, an object of the present invention is to provide a fax-TV having a TV system and a fax, the fax-TV capable of easily transmitting the image information of the TV system to the fax installed within the fax-TV, and a fax transmitting method thereof.

Another object of the present invention is to provide a fax-TV having a TV system and a fax, the fax-TV capable of transmitting the image information of the TV system to another fax provided outside the fax-TV, and a fax transmitting method thereof.

Still another object of the present invention is to provide a fax-TV having a TV system and a fax, the fax-TV capable of not only easily transmitting the image information of the TV system to the fax installed within the fax-TV, but also transmitting the image information of the TV system to another fax provided outside the fax-TV, and a fax transmitting method thereof.

According to one aspect of the present invention, there is provided a fax-TV comprising a TV system, means, connected to the TV system and receiving a synchronization signal and a luminance signal, for converting said luminance signal to fax format data, a modem connected to the fax format data converting means, and means, connected to the modem, for controlling a connection of an outside telephone line and a connection/block of a telephone call.

According to another aspect of the present invention, there is provided a fax-TV comprising a TV system, means for receiving a synchronization signal and a luminance signal from the TV system and converting the luminance signal to fax format data, means for encoding the fax format data, means for printing the fax format data, means for reading data to be transmitted, and buffer memory for storing an output of the encoding means and then transmitting the output of the encoding means to the printing means, and for storing an output of the reading means and then transmitting the output of the reading means to the encoding means. The encoding means also decoding an output of the buffer memory.

According to still another aspect of the present invention, there is provided a fax-TV comprising a TV system, a fax connected to the TV system, and means for controlling the fax, and wherein the fax comprises means for receiving a synchronization signal and a luminance signal from the TV system and converting the luminance signal to a fax format data to produce the fax format data, and means for receiving the fax format data and selecting one from group function consisting of a function of transmitting the luminance signal to the fax, a function of transmitting the luminance signal to another fax provided outside the fax-TV and a normal fax function independently of the TV system, in accordance with a control signal generated by the fax controlling means.

Preferably, the fax format converting means comprises a comparator for receiving said luminance signal and said level change signal and producing a binary luminance signal, memory means for storing the binary luminance signal and then receiving a control signal for producing the stored signal by one bit, a run length encoder for converting an output data of the memory means to a white and black run length value corresponding to the output data, and fax signal converting controlling means for receiving an output of the run length encoder and producing the fax format data. The run length encoder has means for receiving the binary luminance signal from the memory means and producing a level change signal and a white and black signal, means for receiving and the binary luminance signal and for counting a pixel number of the received binary luminance signal, a latch for temporarily storing an output of the counting means and transmitting the stored data to the fax signal converting controlling means, and means for receiving the level change signal and a reset signal from the fax signal converting controlling means and controlling the counting means. The level change signal and white and black signal producing means includes means for delaying the binary luminance signal by one pixel and for producing the white and black signal and means for receiving the white and black signal and the binary luminance signal and for producing the level change signal.

BRIEF DESCRIPTION OF THE DRAWINGS

The advantages and objects of the present invention will become apparent by describing the preferred embodiment of the present invention with reference to the attached drawings, in which:

FIG. 8 is an MH code converting table.

FIGS. 9A through 9C illustrate a portion of a television picture, a run length encoder, and an MH code table, respectively.

DETAILED DESCRIPTION OF THE PREFERRED EMBODIMENT

Figure 1:
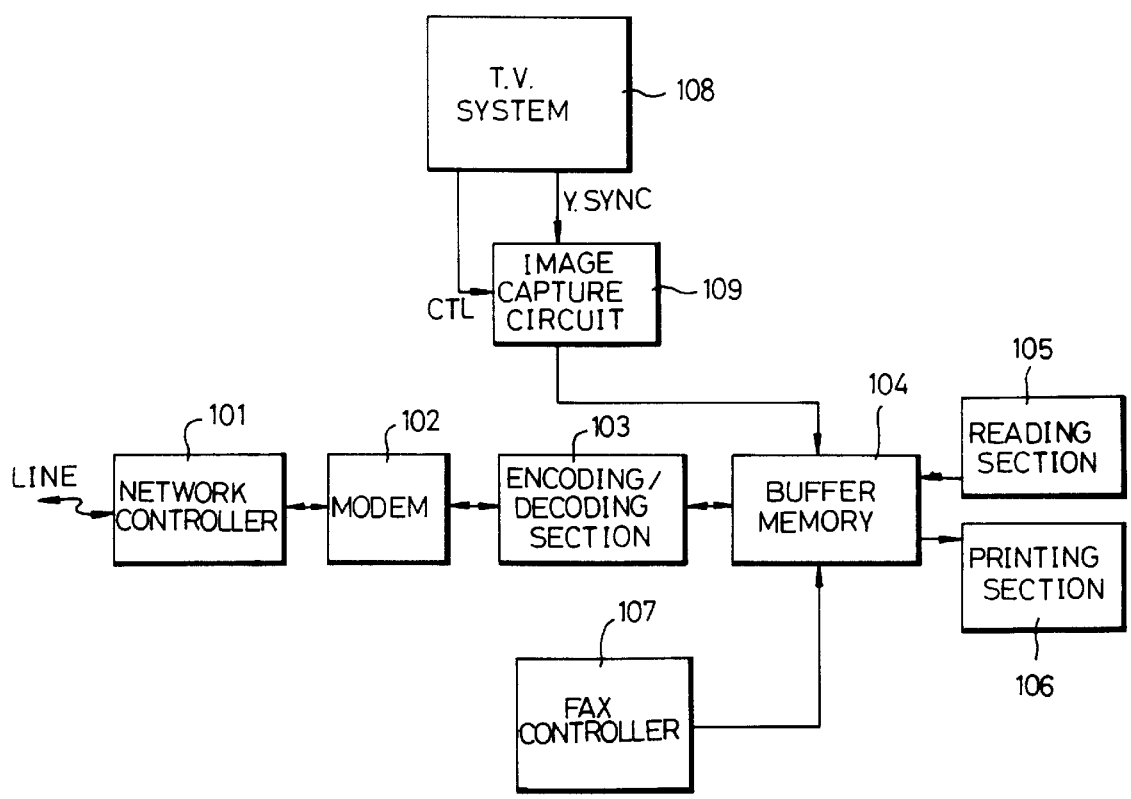
FIG. 1 is a block diagram of a fax-TV according to a conventional art.
Figure 2:
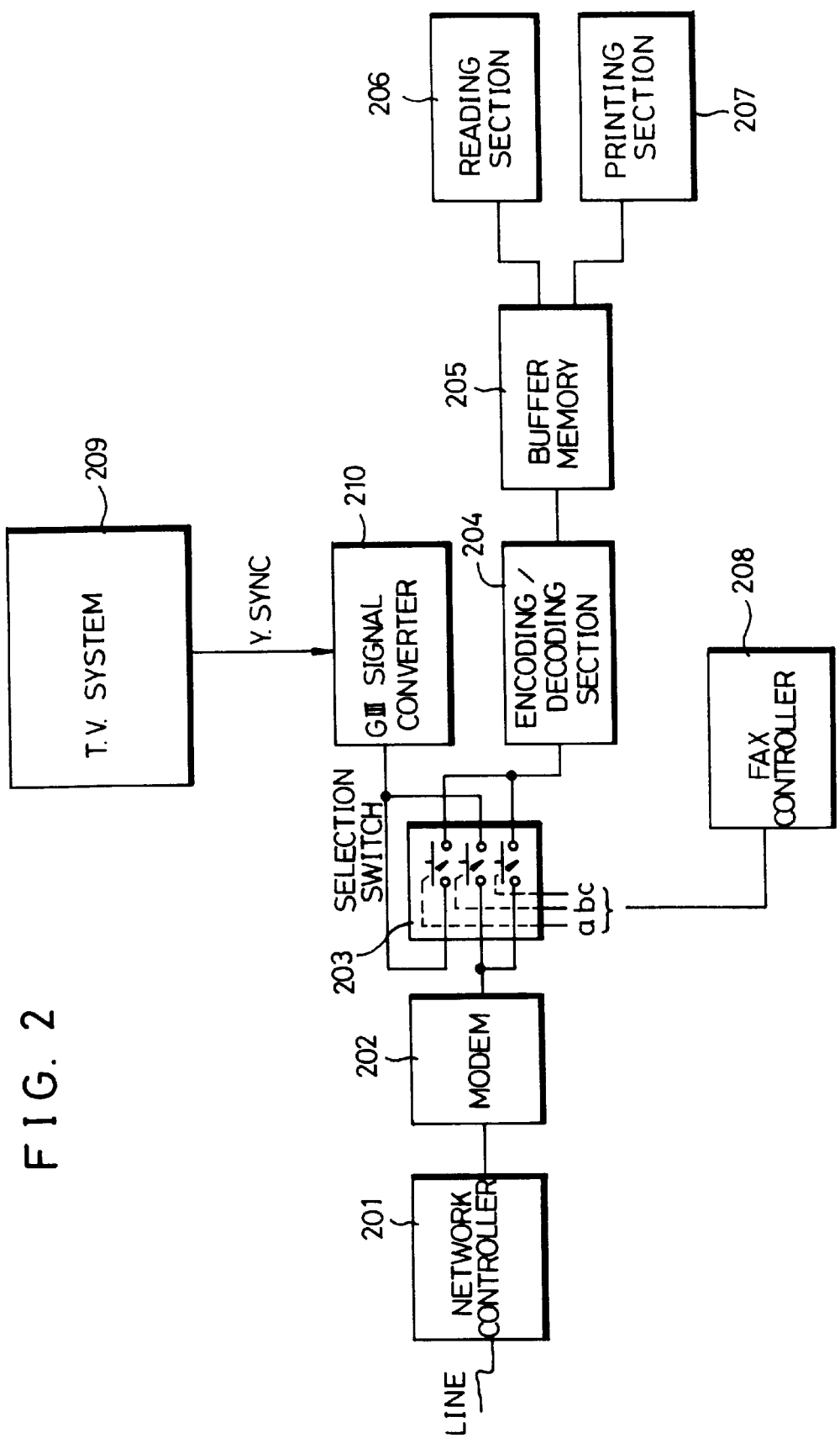
FIG. 2 is a block diagram of a fax-TV according to a present invention.

As to FIG. 2, a fax-TV has a TV system 209 (image signal input device), a fax part 201 through 207, a fax controller 208, and a Group III signal converter 210. The fax, similar to a fax used in the prior art, includes a network controller 201, a modem 202, an encoding/decoding section 204, a buffer memory 205, a reading section 206, and a printing section 207. However, the fax of the present invention, unlike the prior art, contains a Group III signal converter 210 for receiving a synchronization signal and a luminance signal from the TV system 209 and converting the luminance signal to a Group III format data and a selection switch 203 for transmitting the Group III format data either to another fax provided outside the fax-TV through the modem 202 or to the fax installed within the fax-TV or for performing a receiving/transmitting function of the fax independently of the TV system. The selection switch is connected to the encoding /decoding section 204.

Figure 3:
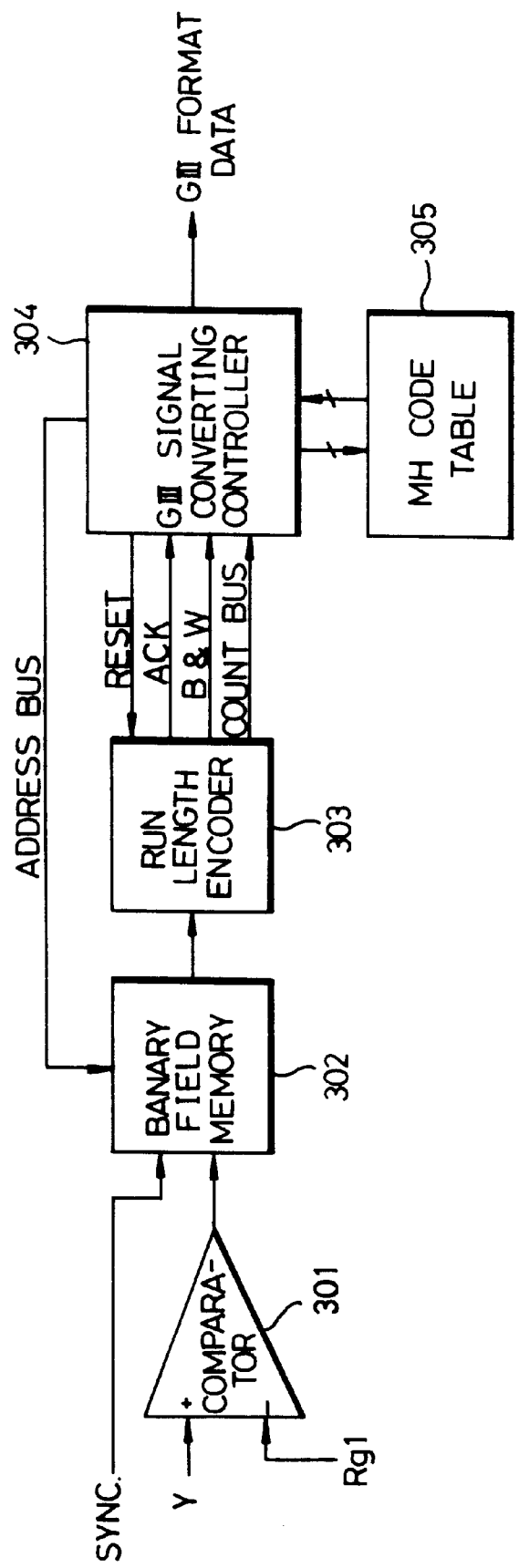
FIG. 3 is a block diagram of a Group III signal converter in FIG. 2.

Referring to FIG. 3, the Group III signal converter 210 has a comparator 301 for comparing a luminance signal Y inputted from the TV system 209 with a reference gray level Rg1 to produce a binary luminance signal of white and black. A binary field memory 302 receives an output of the comparator and the synchronization signal SYNC, for storing the binary luminance signal of one frame in accordance with a control signal inputted through an address bus for producing the binary luminance signal by one bit. A run length encoder 303 receives an output of the binary field memory 302, for providing a run length value of white and black corresponding to the output of the binary field memory 302. A Group III signal converting controller 304 converts the run length value to the Group III format data corresponding thereto with reference to a MH code of the MH code table 305.

Figure 4:
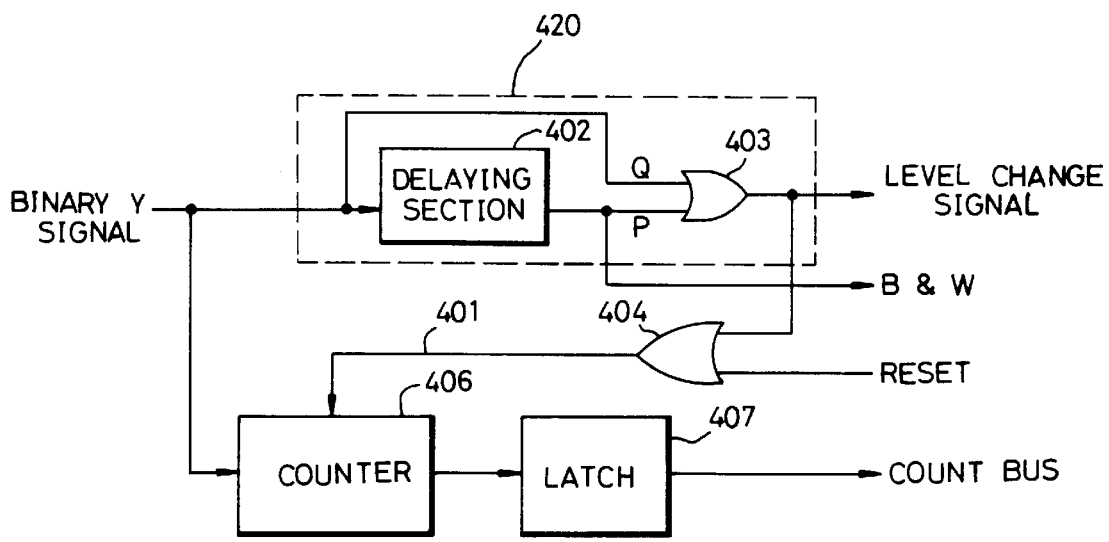
FIG. 4 is a block diagram of a run length encoder.

The details of the run length encoder 303 is shown in FIG. 4. A signal generating section 420 of the run length encoder 303 produces a level change signal ACK and a white and black signal B&W by delaying the binary luminance signal by one pixel and combining the delayed luminance signal at node P and the undelayed luminance signal at node Q respectively. A counter 406 counts a pixel number of the binary luminance signal from the binary field memory. A latch 407 temporarily stores the counting value of the counter and an OR gate 404 receives the level change signal ACK and a reset signal RESET from the Group III signal converting controller 304, to control the counter 406. The signal generating section 420 includes a delaying section 402 for delaying the binary luminance signal and an exclusive OR gate 403 for combining the delayed luminance signal at node P and the undelayed luminance signal at node Q.

Before describing an operation of the present invention, a method for converting the luminance signal to Group III format data will be explained.

Figure 6A:
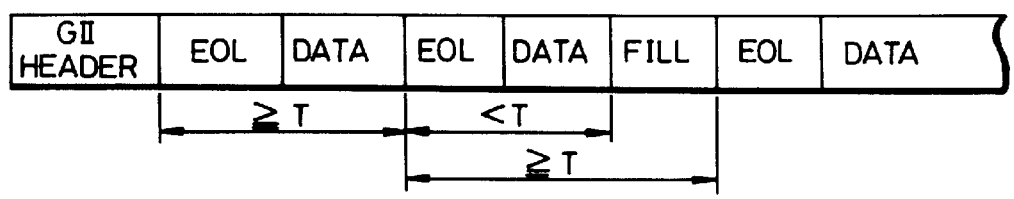
FIGS. 6A and 6B are Group III format tables.
Figure 6B:
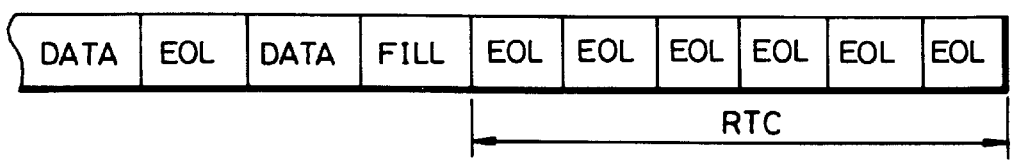

As shown in FIG. 6A, an initial part of one page of the Group III format data is occupied by the Group III data header followed by EOL signal. A bit stream representing the above is "00000000001". This is followed by a data bit stream corresponding to one line of the input image data which is compressed. If the data count T achieved by summing one line input data to be sent/received and EOL signal is more than an average transmission data count of one line input data, EOL data follows. Otherwise, fill data is added thereto in order to reach the data count T. Here, a fill data bit stream is composed of a variable field of "0", and the fill is a bit row of the "0" variable field. On the other hand, as shown in FIG. 6B, a return control signal RTC indicative of end part of the input image data is inserted at end portion of the page. The signal RTC is achieved by repeating EOL signal six times.

As to a method for transforming data to be sent/received through the fax, as shown in FIG. 9A, the image data to be transmitted is illustrated on the fax-TV screen as "FAX" and one line (first line) of a plurality of lines composing the "FAX" is scanned. FIG. 9B represents a white and black level of the scanned data and the pixel count thereof, and the run length code of the scan line is "W3, B5, W4, B2, W4, B2, W3, B2, W3" and this is converted to MH (modified Hoffman) code. The MH code conversion is achieved by using the MH code table of FIG. 8. For example "W3" is converted to "1000" and "B5" is converted to "0011". Accordingly the run length code of the first line of the "FAX" of FIG. 9A is MH code converted to "1000 0011 1011 11 1011 11 1000 11 1000" and EOL code and fill data(if necessary) are inserted before the converted MH code, completing a code corresponding to one line of Group III format data.

An operation of the present invention will now be explained.

Referring to FIG. 2, the TV system 209, the network controller 201, the modem 202, the encoding/decoding section 204, the buffer memory 205, the printing section 207 and the reading section 206 are the same as those of the conventional art in their function.

The luminance signal Y of the TV system 209 is applied to a non-inverting port (input) of a comparator 301, and a binary luminance information of white and black is produced according to a gray level $R_g1$ provided to an inverting port (input) of the comparator. The binary luminance information is stored in a binary field memory 302 on a frame by frame basis according to a synchronization signal SYNC inputted from the television system 209. The output of the binary field memory 302 is transmitted bit by bit to the run length encoder 303 through an address bus of the Group III signal converting controller 304. The binary luminance information of the binary field memory 302 is delayed through one pixel delaying section 402 (FIG. 4), producing a white and black signal at node P and the OR gate 403 receives the delayed image information and the undelayed image information at node Q and generates a level change signal ACK. In detail, if two pixels of black level or white level are subsequently inputted, the level change signal of logic "low" is produced, and if one pixel of black level (or white level) is followed by another pixel of white level (or black level), the level change signal of logic "high" is produced. In the meantime, the pixel of the binary luminance information is counted by the counter 406 when pixels of the same type as the previous pixel, for example a black pixel followed by another black pixel, are subsequently inputted. The count value is temporarily stored in the latch 407 and then sent to the Group III signal converting controller 304 through a count bus. When the level change signal ACK of logic "high" is generated, which is indicative of level change from black level to white level, or from white level to black level, the counter 406 is reset through the OR gate 404 in order to inform the counter 406 of the level change. If the end of one line of input image data is reached during the continuation of repeating black level pixel or repeating white level pixel, the run length value at that time is read and the run length encoder 303 is reset by the Group III signal converting controller 304, and the run length encoder 303 starts to encode the run length value of the next line of the input image data. Then, the Group III signal converting controller 304 produces the Group III format data to the selection switch 203 (FIG. 2) with reference to the MH code table. At this time, if signal "a" is applied from the fax controller 208 to the selection switch 203, the Group III signal converter 210 is connected to the encoding/decoding section 204 and the image data of the television system is transmitted to the fax installed within the fax-TV through the encoding/decoding section 204, the buffer memory 205 and the printing section 207. If signal "b" is applied from the fax controller 208 to the selection switch 203, the Group III signal converter 210 is connected to the modem 202 and the image data of the TV system is transmitted to another fax provided outside the fax-TV through the modem 202 and the network controller 201. If signal "c" is applied from the fax controller 208 to the selection switch 203, the modem 202 is connected to the encoding/decoding section 204, performing the normal fax transmitting/receiving function.

Figure 5:
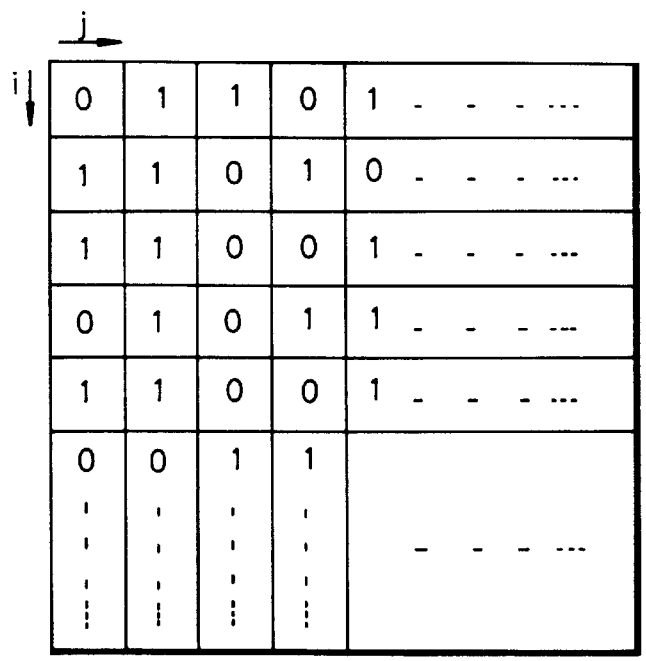
FIG. 5 is a table of a binary field memory map.
Figure 7:
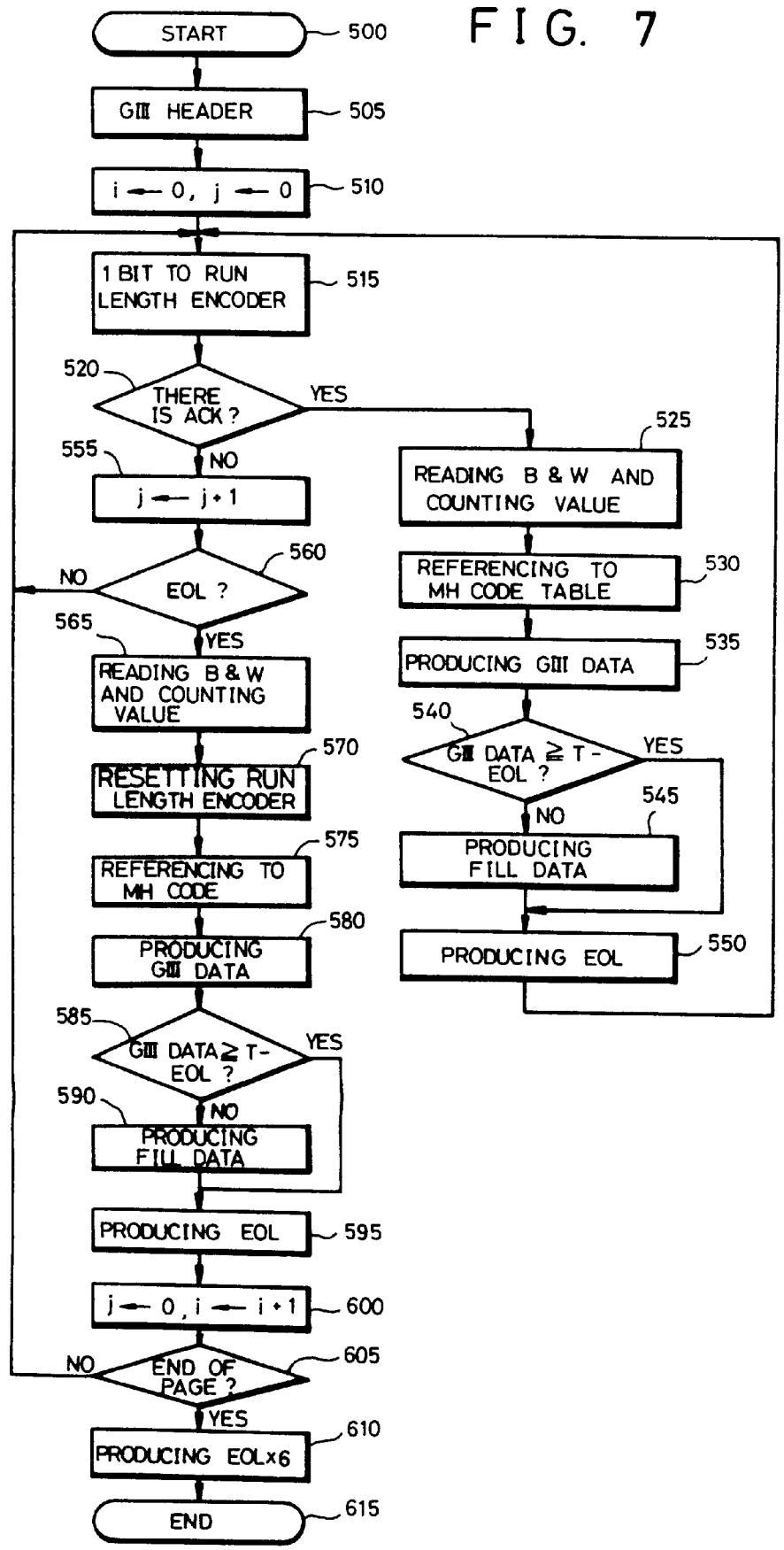
FIG. 7 illustrates a flow chart of a Group III signal converting controller of a fax television.

Referring to FIG. 7, the operation of the Group III signal converting controller in the fax television according to the present invention will be explained. The initial part of one page of the Group III format data, is occupied by the header corresponding to Group III format protocol, which is sent to the selection switch 203 (step 505). If the address of the binary field memory is designated, one bit data being stored in the binary field memory 302 and corresponding to an entry (j,i) as determined by steps 555 and 600 is transmitted to the run length encoder 303 (as shown in FIG. 5) (steps 510 and 515). In decision 520, it is checked whether or not there is the level change signal in the run length encoder 303. If there is the level change signal, the run length value of portion at which the level change signal appears is read and then converted to Group III format data (steps 525, 530 and 535). Thereafter, the number of output Group III format data is compared with the average transmission data count T with respect to one line of the input image data, and according to the above result the addition of fill data is determined and EOL data is inserted (steps 540, 545 and 550). Then, the process goes back to step 515.

During the repetition of the above described operation, if there is no level change signal at decision 520, it is examined whether the next pixel is the end of one line (decision 560). If the next pixel is not the end of one line, control passes to step 515 and one bit data is transmitted to the run length encoder 303. Otherwise, control passes to step 565, and the run length value of the run length encoder 303 is read and the run length encoder is reset (steps 565 and 570). In steps 575 and 580, the run length value is converted to the Group III format data according to the MH code converting table (FIG. 8). Thereafter, the number of the output Group III format data is compared with the average transmission data count T to determine the addition of and insert fill data if any and the EOL data is inserted (steps 585, 590, and 595). During the repetition, if the Group III signal converting controller 304 reaches the end of input image data, EOL data is produced six times by the Group III signal converting controller 304, finishing the Group III format data conversion.

As described above, the present invention converts the image signal of the TV system to Group III format data using an encoding method used in the fax, connects the converted image signal to the fax, and can either transmit the TV image signal to the fax provided outside the fax-TV or to the fax installed within the fax-TV, without largely modifying the structure of the conventional fax. In particular, the spirit of the present invention is applicable to any fax using the Group III format data.

What is claimed is:

1. A facsimile-television control apparatus comprising:
   a television portion;
   a facsimile portion;

a signal converting section for receiving a synchronization signal and a luminance signal from said television portion and for converting said luminance signal to a facsimile signal;

a switching section for receiving said facsimile signal and for selecting one function among a group of functions which include: (i) transmitting and receiving other facsimile signals that are not produced by the signal converting section using said facsimile portion, (ii) transmitting said facsimile signal from said signal converting section to another facsimile device separate from said control apparatus, and (iii) printing an image based on the facsimile signal using the facsimile portion; and a facsimile control section for controlling the switching section to select among the group of functions.

2. The facsimile-television control apparatus as claimed in claim 1, wherein said signal converting section comprises:

a comparator for receiving said luminance signal and a reference signal and for producing a binary luminance signal;

memory for storing said binary luminance signal and then receiving a control signal for producing the stored signal;

a run length encoder for converting an output data of said memory to a white and black run length value corresponding to said output data; and facsimile signal converting controlling means for receiving an output of said run length encoder and for producing said facsimile signal.

3. The facsimile-television control apparatus as claimed in claim 2, wherein said run length encoder comprises:

means for receiving said binary luminance signal from said memory and for producing a level change signal and a white and black signal, means for receiving said binary luminance signal and for counting the number of pixels of the received binary luminance signal;

a latch for temporarily storing an output of said counting means and transmitting the temporarily stored data to said facsimile signal converting controlling means; and means for receiving said level change signal and a reset signal from said facsimile signal converting controlling means and for controlling said counting means.

4. The facsimile-television control apparatus as claimed in claim 3, wherein said level change signal and white and black signal producing means comprises:

means for delaying said binary luminance signal by one pixel and for producing said white and black signal; and means for receiving said white and black signal and said binary luminance signal and for producing said level change signal.

5. A method of outputting an image facsimile signal from a facsimile-television system having a television portion and a facsimile portion, the method comprising:

receiving a synchronization signal and a luminance signal indicative of the image facsimile signal from the television portion;

converting the luminance signal to a facsimile signal using the synchronization signal, the converting being performed in a signal converting section in the facsimile portion; and selecting one function from among a group of functions based on a received control signal, the functions including (i) transmitting and receiving other facsimile signals that are not produced by the signal converting section using the facsimile portion, (ii) transmitting the facsimile signal from the signal converting section to another facsimile device separate from the facsimile-television system, and (iii) printing an image based on the facsimile signal using the facsimile portion.

6. A method as claimed in claim 5, wherein the signal converting step comprises:

(a) generating a header corresponding to a facsimile format protocol and producing said header to a selection switching section;

(b) generating a binary signal from said luminance signal and transmitting the binary luminance signal to a run length encoder bit by bit;

(c) determining whether there is a level change signal with respect to said luminance signal during step (b);

(d) when there is said level change signal, reading a run length value upon said level change signal and producing said facsimile signal with reference to a MH code table;

(e) determining whether or not a fill data is added to said facsimile signal, producing EOL data and then advancing to step (b);

(f) if there is said level change signal at step (c) determining whether or not a next pixel is an end of line of a page of data, and then if it is not said end, advancing to step (b) and if it is said end, reading a run length value thereof and after resetting said run length encoder, producing said facsimile signal with reference to said MH code table;

(g) determining whether or not a fill data is added to said facsimile signal from step (f), producing said EOL data;

(h) determining whether or not a next pixel is an end of line of said page, and then if it is not said end, advancing to step (b) and if it is said end, producing said EOL data six times.

7. A method as claimed in claim 6, wherein the addition of said fill data at steps (e) and (g) is determined by comparing said facsimile signal to an average transmission signal number per one line.

* * * * *